(12) United States Patent
Wilson

(10) Patent No.: US 8,076,257 B1
(45) Date of Patent: Dec. 13, 2011

(54) HIGH TEMPERATURE CERAMIC DIELECTRIC COMPOSITION AND CAPACITORS MADE FROM THE COMPOSITION

(75) Inventor: James M. Wilson, North Adams, MA (US)

(73) Assignee: MRA Laboratories, Inc, Adams, MA (US)

( * ) Notice: Subject to any disclaimer, the term of this patent is extended or adjusted under 35 U.S.C. 154(b) by 357 days.

(21) Appl. No.: 12/386,736

(22) Filed: Apr. 22, 2009

Related U.S. Application Data

(60) Provisional application No. 61/125,155, filed on Apr. 23, 2008.

(51) Int. Cl.
*C04B 35/465* (2006.01)
*C04B 35/468* (2006.01)
*H01G 4/06* (2006.01)

(52) U.S. Cl. ............... 501/139; 501/136; 361/321.4
(58) Field of Classification Search ............. 501/139, 501/136; 361/321.4
See application file for complete search history.

(56) References Cited

U.S. PATENT DOCUMENTS

| | | | |
|---|---|---|---|
| 4,379,319 A | 4/1983 | Wilson | |
| 4,500,942 A | 2/1985 | Wilson | |
| 5,128,289 A | 7/1992 | Wilson | |
| 5,571,767 A | 11/1996 | Wilson et al. | |
| 6,231,779 B1 * | 5/2001 | Chiang et al. | 252/62.9 R |
| 6,723,673 B2 | 4/2004 | Maher et al. | |
| 6,727,200 B2 | 4/2004 | Maher et al. | |
| 6,793,843 B2 * | 9/2004 | Furukawa et al. | 252/62.9 R |
| 7,090,785 B2 * | 8/2006 | Chiang et al. | 252/62.9 R |
| 7,893,001 B2 * | 2/2011 | Shimada et al. | 501/138 |
| 2002/0036282 A1 * | 3/2002 | Chiang et al. | 252/62.9 R |

FOREIGN PATENT DOCUMENTS

JP 2007145644 * 6/2007

OTHER PUBLICATIONS

"New Ferroelectrics of Complex Composition IV", Soviet Physics—Solid State, vol. 2, No. 11, May, 1961.
"(Bi1/2Na1/2) TiO3—BaTiO3 System for Lead-Free Piezoelectric Ceramics", Japanese Journal of Applied Physics, vol. 30, No. 9B, Sep. 1991.
"Effect of A-site Substitution on Crystal Component and Dielectric Properties in Bi.5Na.5TiO3 Ceramics", Materials Science and Engineering, B 121, 2005.

\* cited by examiner

*Primary Examiner* — Karl Group
(74) *Attorney, Agent, or Firm* — Malcolm J. Chisholm, Jr.

(57) ABSTRACT

A bismuth sodium titanate ($Bi_{0.5}Na_{0.5}TiO_3$) base material is modified by the partial substitution of aliovalent A-site cations such as barium (as BaO) or strontium (as SrO), as well as certain b-site donor/acceptor dopants and sintering aids to form a multi-phase system, much like known "core/shell" X7R dielectrics based solely on $BaTiO_3$. The resulting ceramic dielectric composition is particularly suitable for producing a multilayer ceramic capacitor (10) that maintains high dielectric constant (and thus the capability of maintaining high capacitance) over a broad temperature range of from about 150° C. to about 300° C. Such capacitors (10) are appropriate for high temperature power electronics applications in fields such as down-hole oil and gas well drilling.

17 Claims, 11 Drawing Sheets

US 8,076,257 B1

HIGH TEMPERATURE CERAMIC DIELECTRIC COMPOSITION AND CAPACITORS MADE FROM THE COMPOSITION

CROSS REFERENCE TO RELATED APPLICATION

This Application claims the benefit of U.S. Provisional Patent Application Ser. No. 61/125,155 that was filed on Apr. 23, 2008, entitled "High Temperature Ceramic Dielectric Composition and Capacitors Made from the Composition".

TECHNICAL FIELD

This invention relates to dielectric compositions and more particularly to dielectric ceramic powder mixtures suitable for the manufacture of multilayer ceramic capacitors ("MLCC's") for use in an elevated temperature range of 150° C. to about 300° C.

BACKGROUND ART

It is believed that capacitors capable of operating in harsh, high temperature environments including temperature ranges of between about 150 degrees Celsius (° C.) to 300° C. will be in high demand for power electronics for markets such as oil and gas well drilling. Such "down hole" applications are becoming increasingly demanding from a temperature of operation standpoint, as drilling for deeper and less accessible reserves becomes more and more the norm.

Until now, the "down hole" industry has relied on the use of multilayer ceramic capacitors ("MLCC's") made essentially from modified barium titanate ($BaTiO_3$). Such capacitors are manufactured to meet electronic industry standards such as X7R (wherein capacitance should not change by more than plus or minus 15% over an operating temperature range of −55° C. to 125° C.), X8R (which extends the range of the X7R to 150° C. with plus or minus 15% change), or BX (which includes an additional requirement of limiting capacitance change to −25% over the −55° C. to 125° C. temperature range with rated voltage applied). Typically, the dielectrics employed in these MLCC's are $BaTiO_3$ based, with various donor/acceptor dopant and fluxing additions that shift and flatten the high temperature (approximately 125° C.) ferroelectric tetragonal to paraelectric cubic phase transitions (Curie point) so that the previously mentioned electronic industry's temperature coefficients can be met, as well as to improve the sintering characteristics of the individual dielectrics. Typical of such dielectric compositions are those disclosed in U.S. Pat. Nos. 6,723,673, 5,128,289 and 5,571,767. (Each of these patents includes an inventor or co-inventor that is the inventor of the present disclosure, which patents are also hereby incorporated herein by reference thereto.) The sintered dielectric of MLCC's manufactured with these types of materials exhibits what is commonly referred to as a core/shell microstructure in which nearly pure $BaTiO_3$ grain cores are surrounded by a heavily doped shell region. It is this heterogeneous structure that allows for the shifting and flattening of the Curie point. (For purposes herein, the phrase Curie point is to mean a transition temperature marking a change in the ferroelectric properties of a substance, especially the change from a ferroelectric to a paraelectric state.)

SUMMARY OF THE INVENTION

The invention includes temperature stable high dielectric constant, high temperature ceramic dielectric compositions and capacitors made from the compositions. The applicable dielectric ceramic is produced by doping a base $Me_x(Bi_{0.5}Na_{0.5})_{1-x}TiO_3$ composition with donors such as $Nb^{5+}$ and $Nd^{3+}$, acceptors such as $Zn^{2+}$ and $Mn^{2+}$, and a glass forming agent such as $SiO_2$ or other known glass forming agents. In the base composition, $Me_x(Bi_{0.5}Na_{0.5})_{1-x}TiO_3$, Me is either $Ba^{2+}$ or $Sr^{2+}$ and X=from about 0.06 to 0.12.

It is believed that the addition of the dopants $Nb^{5+}$, $Nd^{3+}$, $Zn^{2+}$, and $Mn^{2+}$, along with addition of the glass forming agent forms a heterogeneous "core/shell" type structure when sintered to high densification, as in that required to produce reliable multilayer ceramic capacitors. For the present disclosure, the composition $Me_x(Bi_{0.5}Na_{0.5})_{1-x}TiO_3$ of the sintered solid-solution would likely make up most of the grain core regions, and the shell would likely contain large amounts of the donor/acceptor dopants, while grain boundaries would likely contain silica rich, glassy phases.

Furthermore, it is believed that addition of the various dopants and glass formers is responsible for the unique and highly improved electrical properties achieved in MLCC's utilizing these dielectrics, when compared to those that utilize conventional $BaTiO_3$ "core/shell" dielectrics. A major problem in producing MLCC's for use in the temperature range of 150° C. to about 300° C. is that the conventional $BaTiO_3$ based dielectrics lose most of their dielectric constant at the required high operating temperatures. For example, in commercial X8R capacitors (wherein, temperature coefficient of capacitance ("TCC") must be plus or minus 15% from −55° C. to 150° C.), the ceramic dielectrics lose about 45% or more of their dielectric constant at 200° C., and the value decreases dramatically thereafter. This severely limits the obtainable capacitance in these devices as the capacitance is proportional to the dielectric constant of the material. The 25° C. dielectric constant of commercial X8R dielectrics is normally about 2000. This value decreases as ferroelectric behavior is lost. The value is about 1100 at 200° C., and about 400 at 250° C. Conversely, the new high temperature ceramic dielectric compositions of the present invention have a room temperature dielectric constant of about 1700 and the value increases to where it remains between about 3600 and 4000, or greater, in the critical capacitor operating range of 150° C. to about 300° C.

A significant component of the present compound $Me_x(Bi_{0.5}Na_{0.5})_{1-x}TiO_3$ includes the bismuth sodium titanate ($Bi_{0.5}Na_{0.5}TiO_3$) base material which is a perovskite ferroelectric. It was discovered by G. A. Smolenskii et. al. in 1960 that this particular perovskite ferroelectric had many advantages because of its high Curie point of approximately 320° C., as reported in "New Ferroelectrics Of Complex Composition IV", *Soviet Physics—Solid State*, Vol. 2, No. 11, May, 1961. However, as attached FIG. 1 clearly illustrates the dielectric constant shown in the left vertical axis is relatively low at approximately 2300, the temperature stability of dielectric constant is poor, and dielectric losses (referred to hereinafter variously as "tgδ" and "tan δ") shown in the right vertical axis are high in the elevated temperature range of interest.

Further research on the perovskite ferroelectric $(Bi_{0.5}Na_{0.5})TiO_3$ was performed by Takenaka et. al., as reported in "$(Bi_{1/2}Na_{1/2})TiO_3$—$BaTiO_3$ System for Lead-Free Piezoelectric Ceramics", *Japanese Journal of Applied Physics*, Vol. 30, No. 9B, September, 1991. Work by these scientists combined the perovskite ferroelectric $(Bi_{0.5}Na_{0.5})TiO_3$ with barium titanate $BaTiO_3$ as solid solutions of $(Bi_{0.5}Na_{0.5})TiO_3+BaTiO_3$ for lead free piezoelectric ceramics. They reported that a rhombohedral to tetragonal morphotropic phase boundary exists in solid solutions with about six to seven mole % barium replacing bismuth and sodium. While the resultant ceramics exhibited relatively low permittivities and losses remain quite high at elevated temperatures, piezoelectric properties were improved. Recently, Qu et. al. reported on the effects of $Ba^{2+}$ substitution on the dielectric properties of $Bi_{0.5}Na_{0.5}TiO_3$ in "Effect of A-site Substitution on Crystal Component and Dielectric Properties in $Bi_{0.5}Na_{0.5}TiO_3$ Ceramics", *Materials Science and Engi-* neering, B 121, 2005. In that report, while $Ba^{2+}$ doping was noted to alter the lattice structure and lead to an improvement in dielectric properties, dielectric losses remain high in much of the elevated temperature regime, and temperature stability of dielectric constant still varies by about 30% over the desired operating range. This is shown in FIG. 2 that plots the change in dielectric constant in the left vertical axis and also shows a change in dielectric losses on the right vertical axis over an extended temperature range shown on the horizontal axis.

An object of the current invention is to provide an improved dielectric composition for use in the 150° C. to 300° C. temperature regime. The resulting new dielectric composition of the present disclosure can be employed to manufacture high temperature multilayer ceramic capacitors ("MLCC's") with highly desirable properties. Such desirable properties include: a high dielectric constant of between 3600 and 4000 or greater, with dielectric losses ("tgδ") of less than 1%; a change of dielectric constant of less than plus or minus 15% over the operating temperature range of 150° C. to about 300° C.; and excellent dielectric constant/voltage characteristics whereby the dielectric constant does not change by more than about 20% over that same operating temperature range with a 50 volt per mil direct current ("Vdc") applied to the capacitor.

The compositions of the present invention therefore represent an increase of 10 times the available dielectric constant. Consequently, MLCC's can be produced with 10 times the capacitance at critical operating temperatures if the same capacitor size and design are employed, or alternately, the size of the component package can be reduced by the same amount. It is believed both of these options will be considered highly attractive for designers of high temperature power electronics. The significant differences in the change of dielectric constant over a temperature range for a conventional X8R dielectric compared to a dielectric of the present invention are contrasted dramatically in FIG. 3.

Accordingly, it is an object of this invention to provide novel high temperature dielectric ceramic compositions based on the general formula $Me_x(Bi_{0.5}Na_{0.6})_{1-x}TiO_3$, where $Me=Ba^{2+}$ or $Sr^{2+}$ and x=from about 0.06 and about 0.12, and that is modified to meet desired electrical characteristics by the use of certain donor ions such as $Nb^{5+}$ and $Nd^{3+}$, certain acceptor ions such as $Zn^{2+}$ and $Mn^{2+}$, and a glass forming agent such as $SiO_2$. The high temperature ceramic dielectric compositions of the present invention may also be used at the noted temperature range while being classified as "environmentally friendly". That is because the composition does not include compounds of lead, cadmium, or hexavalent chromium. Another object of this invention is to provide an improved high temperature multilayer ceramic capacitor that has incorporated therein the high temperature ceramic dielectric compositions of the present invention, as described above.

These and other objects of the present invention will be apparent hereinafter from the following description and the accompanying drawings.

PREFERRED EMBODIMENTS OF THE INVENTION

The preferred embodiments of high temperature ceramic dielectric compositions of the present invention resulted from extensive experimentation that will be described herein. The preferred compositions were developed by testing the samples described below in the form of both experimental monolayer structures and multilayer ceramic capacitor ("MLCC") structures, as shown in the tables below.

Figure 4:
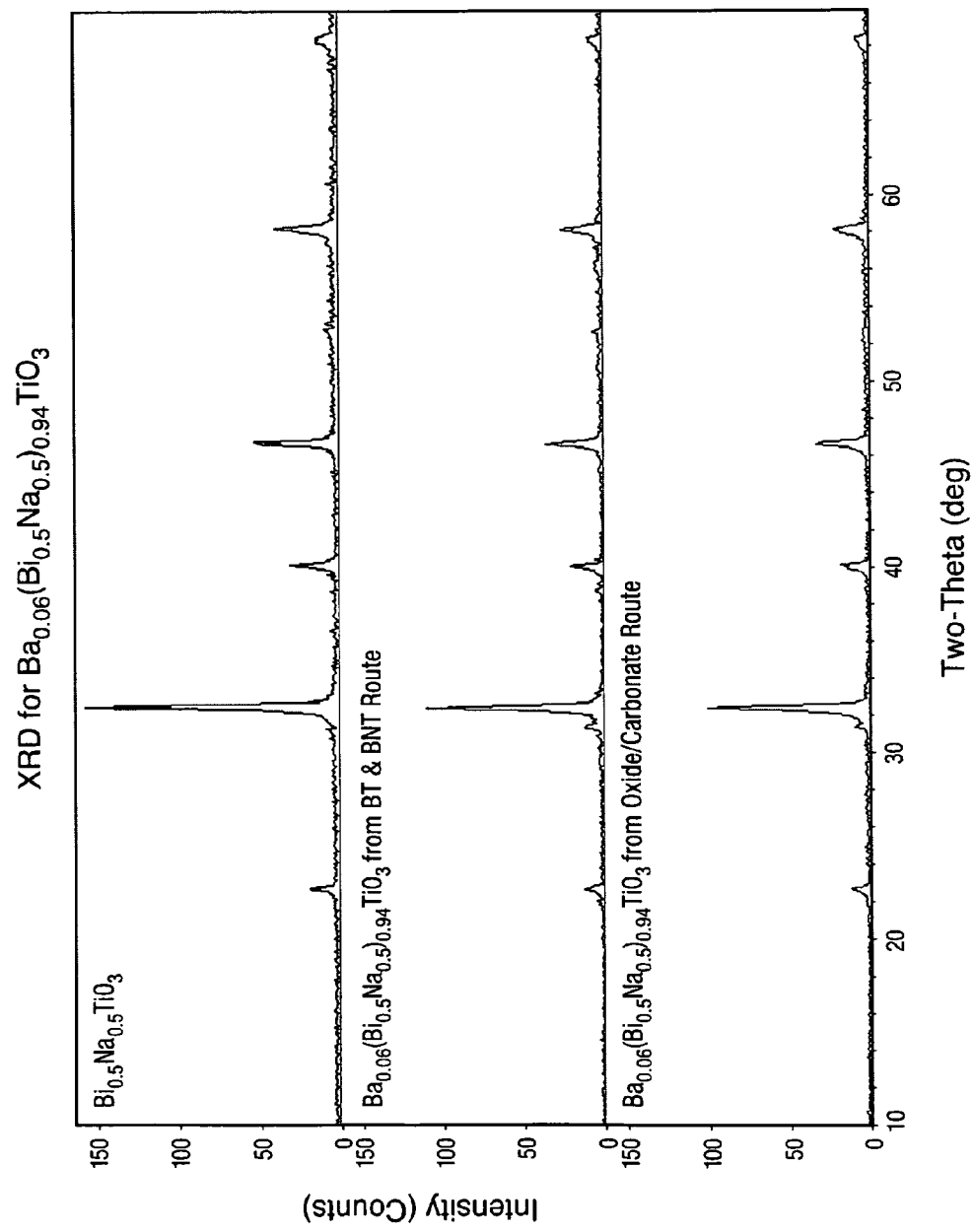
FIG. 4 is a copy of an X-Ray Diffraction (XRD) scan comparing $Bi_{0.5}Na_{0.5}TiO_3$ and $Ba_{0.06}(Bi_{0.5}Na_{0.5})_{0.94}TiO_3$ synthesized from two different routes disclosed herein.

A bismuth sodium titanate ($Bi_{0.5}Na_{0.5}TiO_3$) base material is modified by the partial substitution of aliovalent A-site cations such as barium (as BaO) or strontium (as SrO), as well as certain b-site donor/acceptor dopants and sintering aids to form what is believed to be a multi-phase system, much like current "core/shell" X7R dielectrics based solely on $BaTiO_3$. The $Me_x(Bi_{0.5}Na_{0.5})_{1-x}TiO_3$ solid-solution material of the present invention was first prepared by standard ceramic processing techniques using two different sets of precursor materials. The actual solid-solution formulation employed was as follows; $Me_x(Bi_{0.5}Na_{0.5})_{1-x}TiO_3$, where Me is $Ba^{2+}$ (as BaO) and x is 0.06. In the first experiment, $BaTiO_3$ and pre-reacted $Bi_{0.5}Na_{0.5}TiO_3$ were carefully weighed to the correct stoichiometric amounts and allowed to mix in a polyethylene bottle with isopropyl alcohol and yttria stabilized $ZrO_2$ grinding media for a period of about eighteen hours. The slurry was then poured into a glass dish and thoroughly dried. The dried cake was then granulated to a powder, calcined at 800° C. for 3 hours in a $Al_2O_3$ dish, and again, granulated to yield about 100 g of the base solid-solution $Ba_{0.06}(Bi_{0.5}Na_{0.5})_{0.94}TiO_3$. The largely single-phase material properties were verified by X-Ray Diffraction ("XRD"), as shown in FIG. 4.

In a second experiment, fine powders of $BaCO_3$, $Bi_2O_3$, $Na_2CO_3$ and $TiO_2$ were carefully weighed, mixed, and processed as above. The resultant $Ba_{0.06}(Bi_{0.5}Na_{0.5})_{0.94}TiO_3$ solid-solution was, again, verified by XRD as shown in FIG. 4. Each of the base $Ba_{0.06}(Bi_{0.5}Na_{0.5})_{0.94}TiO_3$ materials were mixed with a small amount of polyvinylbutyral ("PVB") binder, dried on glass plates, and granulated into die pressable powders. Disc capacitors 0.5" diameter and about 0.04" thick were pressed at a load pressure of about 12,000 lbs. The discs were placed on a stabilized $ZrO_2$ setter and sintered at 1150° C. for 3 hours. Fired discs were then terminated by applying a silver thick film paste to both sides, and after drying, firing the terminations at 730° C. for about one hour. The resultant monolayer disc capacitors were then evaluated for certain physical and electrical properties as shown in the following Table 1.

TABLE 1

Densities, dielectric constants, tgδ's, and resistivity measurements for
$Ba_{.06}(Bi_{.5}Na_{.5})_{.94}TiO_3$ prepared via BT + BNT and oxide/carbonate routes.

| Prep. Route | Ts °C. | Density g/cc | 1 KHz, 1 VRMS Dielectric Constant and Tgδ (%) | | | | 200 Vdc Resistivity (Ω) | |
|---|---|---|---|---|---|---|---|---|
| | | | 25° C. | 150° C. | 175° C. | 200° C. | 25° C. | 200° C. |
| BT + BNT * | 1150° C./3 | 5.78 | 824/3.86 | 2028/7.38 | 2321/11.58 | 2745/15.27 | $5.5 \times 10^{10}$ | $3.6 \times 10^{10}$ |
| Oxide/Carbonate ** | 1150° C./3 | 5.69 | 887/2.61 | 2550/6.51 | 2940/8.02 | 3434/13.36 | $5.5 \times 10^{10}$ | $7 \times 10^{10}$ |

* BT + BTNT is $BaTiO_3 + Bi_{0.5}Na_{0.5}TiO_3$
** Oxide/Carbonate is $BaCO_3 + Bi_2O_3 + Na_2CO_3 + TiO_2$ Route As one can see from Table 1, the oxide/carbonate route produced a $Ba_{0.06}(Bi_{0.5}Na_{0.5})_{0.94}TiO_3$ base material with higher dielectric constant, lower Tgδ, and higher resistivity in the temperature range of interest, i.e. greater than 150° C. While it was decided to attempt to further modify the base material prepared from the oxide/carbonate route in light of the improved electrical properties observed, experiments by the inventor demonstrated that the BT+BNT route could also be utilized to prepare satisfactory high temperature dielectrics.

In the next series of experiments $Me_x(Bi_{0.5}Na_{0.5})_{1-x}TiO_3$ base materials were prepared via the oxide/carbonate route, as disclosed previously. The pre-reacted base materials were then thoroughly mixed with additives using the same process used to produce said base materials. The final compositions are disclosed in the following table.

TABLE 2

Experiment numbers and formulations evaluated for this disclosure.

| | $Me_x(Bi_{0.5}Na_{0.5})_{1-x}TiO_3$ | | Additives (Mole %) | | | | |
|---|---|---|---|---|---|---|---|
| Exp. # | Base Composition | Mole % | $Nb_2O_5$ | MnO | $Nd_2O_3$ | ZnO | $SiO_2$ |
| 07-190 | $Ba_{.06}(Bi_{.5}Na_{.5})_{.94}TiO_3$ | 98.892 | 1.054 | .054 | — | — | — |
| 07-198 | $Ba_{.06}(Bi_{.5}Na_{.5})_{.94}TiO_3$ | 98.894 | — | .052 | 1.054 | — | — |
| 07-200 | $Ba_{.06}(Bi_{.5}Na_{.5})_{.94}TiO_3$ | 98.350 | 0.882 | .088 | .127 | .286 | .267 |
| 07-208 | $Ba_{.06}(Bi_{.5}Na_{.5})_{.94}TiO_3$ | 98.325 | 1.572 | .103 | — | — | — |
| 07-214 | $Sr_{.06}(Bi_{.5}Na_{.5})_{.94}TiO_3$ | 98.909 | 1.040 | .051 | — | — | — |
| 07-215 | $Ba_{.12}(Bi_{.5}Na_{.5})_{.88}TiO_3$ | 98.887 | 1.060 | .053 | — | — | — |

Disc capacitors were prepared from the compositions listed in Table 2, and processed as discussed previously. Results of sintering trials and electrical measurements are given in Table 3 below.

Comparing data from Tables 2 and 3 it becomes evident that the additions of oxides $Nb_2O_5$, MnO, $Nd_2O_3$, ZnO, and $SiO_2$ to the base $Me_x(Bi_{0.5}Na_{0.5})_{1-x}TiO_3$ composition results in significant enhancement of the dielectric properties. Specifically, room temperature dielectric constant is much higher, the temperature stability of dielectric constant at temperatures of 150° C. or greater is substantially improved, high temperature dielectric losses (tgδ) are dramatically lowered, and resistivities are mostly improved. In addition, many of compositions are now able to be sintered at temperatures of 1125° C. with excellent densification. This 25° C. decrease can be important as it could allow the use of conventional 70Ag/30Pd electrode systems that are commonly employed in the manufacture of MLCC's using air fired dielectrics.

The data in Table 3 indicates that when $Me=Ba^{2+}$, rather than $Sr^{2+}$, in the general formula $Me_x(Bi_{0.5}Na_{0.5})_{1-x}TiO_3$, desirable properties such as dielectric constant and high temperature dielectric loss are enhanced, as shown in the Table 3 comparison of Experiment No. 07-190 to 07-214. Nonetheless it is clear that the additions of the above-noted oxides can

TABLE 3

Densities, dielectric constants, tgδ's, and resistivity
measurements for formulations evaluated for this disclosure.

| Exp. # | Ts °C. | Density g/cc | Dielectric Constant/% Tgδ | | | | 200 Vdc Resistivity (Ω) | |
|---|---|---|---|---|---|---|---|---|
| | | | 25° C. | 150° C. | 175° C. | 200° C. | 25° C. | 200° C. |
| 07-190 | 1150/3 | 5.83 | 1753/4.60 | 3071/0.22 | 3297/0.19 | 3486/0.23 | $1 \times 10^{13}$ | $1.8 \times 10^{11}$ |
| | 1125/3 | 5.87 | 1729/4.82 | 2992/0.26 | 3163/0.19 | 3419/0.24 | $1.65 \times 10^{12}$ | $1.85 \times 10^{11}$ |
| 07-198 | 1150/3 | 5.70 | 1095/3.35 | 2319/1.66 | 2548/1.23 | 2604/1.38 | $1.05 \times 10^{12}$ | $1.75 \times 10^{11}$ |
| | 1125/3 | | did not sinter dense | | | | | |
| 07-200 | 1150/3 | 5.76 | 1509/3.81 | 3149/0.42 | 3297/0.14 | 3362/0.09 | $1.2 \times 10^{12}$ | $2.5 \times 10^{11}$ |
| | 1125/3 | 5.77 | 1504/3.70 | 3171/0.38 | 3164/0.13 | 3244/0.10 | $1.5 \times 10^{12}$ | $2.6 \times 10^{11}$ |
| 07-208 | 1150/3 | 5.77 | 1721/4.11 | 2824/0.14 | 2949/0.09 | 3122/0.12 | $7.5 \times 10^{12}$ | $1.5 \times 10^{11}$ |
| | 1125/3 | 5.80 | Not Tested | | | | | |
| 07-214 | 1150/3 | 5.81 | 869/3.80 | 1670/1.88 | 1921/1.54 | 1973/0.59 | $1 \times 10^{12}$ | $1 \times 10^{10}$ |
| 07-215 | 1150/3 | 5.79 | 1499/5.59 | 3399/0.86 | 3630/0.70 | 3710/0.70 | $8 \times 10^{11}$ | $1.2 \times 10^{10}$ |

*Dielectric data obtained @ 1 KHz, 1 VRMS also produce high temperature capacitors of sufficient quality if Me=$Sr^{2+}$. It is for that reason that Me is defined as consisting of either $Ba^{2+}$ or $Sr^{2+}$.

It is also evident from the data disclosed in Table 3 that additions of donor ions such as $Nb^{5+}$ (as $Nb_2O_5$) and acceptor ions such as $Mn^{2+}$ (as MnO) can be varied in their quantity present in the composition and produce very good high temperature properties, as shown in Table 3 comparing Experiment No. 07-190 to 07-208. In fact, it appears that high temperature dielectric losses and stability of dielectric constant are further improved.

Another point of interest that can be seen from the data presented in Table 3 is the effect of increasing $Me_x$, when Me=$Ba^{2+}$, as shown in Experiment No. 07-190 compared to 07-215. While the increase of $Me_x$ from 0.06 to 0.12 results in excellent high temperature stability of dielectric constant and very acceptable dielectric losses at constant donor/acceptor levels, it can also be noted that resistivity appears to decline.

A final observation that can be made from the data presented in Table 3 is the effect of multiple donor ($Nb^{5+}$ and $Nd^{3+}$ as the oxides) and acceptor ($Mn^{2+}$ and $Zn^{2+}$ as the oxides) ions, and the glass former $SiO_2$, have on the dielectric properties of the base material, as shown in Experiment No. 07-190 compared to 07-200. Again, one can observe the trend that increasing the additive levels of the donor/acceptors, as well as varying expected site location ($Nb^{5+}$ expected to occupy small cation b-site due to size of ionic radius and $Nd^{3+}$ expected to occupy large cation a-site for the same reason) results in the improvement of high temperature stability of dielectric constant and losses. The advantages of composition 07-200 shown in Table 3 will be further disclosed to include improved direct current ("DC") bias voltage compared to dielectric constant characteristics when MLCC data is presented elsewhere in this disclosure.

For reasons of expediency, it was decided to take the compositions 07-190 and 07-200 described in Tables 2 and 3 forward and prepare multilayer ceramic capacitors from each to evaluate dielectric properties over the expanded temperature range from about 25° C. to 350° C. Two thousand gram (2 kg) quantities of each formulation were prepared using a standard ceramic process that is similar to that disclosed previously, except that ingredients were thoroughly mixed using a high intensity mixer, the solvent was de-ionized water, and a non-cationic dispersant (trade name Darvan C, available from the RT Vanderbilt company of Norwalk, Conn., U.S.A.) was employed to aid in processing. The resultant base dielectrics gave XRD results that were nearly identical to that obtained previously, such as shown in FIG. 4.

The base materials and requisite additions made to formulate compositions 07-190 and 07-200 were weighed and added to a 2 liter Nalge bottle filled with 3400 g of 10 mm yittria stabilized $ZrO_2$ beads. A mixture of about 33% denatured ethanol and 67% methyl ethyl ketone ("MEK") was added as the solvent, and a non-ionic dispersant (available under the trade name Malialim AKM-0531 from the Nippon Offs and Fats, LTD, company of Tokyo, Japan) was added to aid in processing. The bottle was placed on a roll mill and allowed to mix for 16-20 hours. A 30% PVB in 67% MEK/33% de-natured alcohol binder solution, plasticizer (available under the trade name Santicizer 160 from the Monsanto company of St. Louis, Mo., U.S.A.), and additional solvent mixture were added and the bottle was allowed to mix an additional two hours. The resultant casting slip contained a PVB binder solids to ceramic dielectric powder ratio of about 5.45%, and was of sufficient viscosity to produce tape cast green sheets of about 0.001" thickness. The sheets were cut to size and screen printed with internal electrode pastes. Sheets composed of the 07-190 dielectric were printed with a 20Pt20Pd60Au ternary electrode, while sheets composed of the 07-200 dielectric were screen printed with both the 20/20/60 ternary, and a 70Ag/30Pd electrode ink. The 20/20/60 ternary electrode was utilized in these experiments to determine if any compatibility problems might result from the use of the less thermodynamically stable 70Ag/30Pd binary system.

Three stacks of the printed sheets (two with the 20/20/60 ternary electrode and one with the 70Ag/30Pd electrode) plus sufficient cover layers were then laminated into bars and cut into individual 0.0805 size green capacitors as taught, for example, in U.S. Pat. Nos. 4,379,319 and 4,500,942 (which Patents are hereby incorporated herein by reference thereto), among others. The unfired MLCC's were loaded onto $ZrO_2$ setters and placed in an oven to burn out organic binder constituents. A 48 hour cycle from room temperature to 400° C., with a two hour hold at peak temperature was employed for this step. The MLCC's were then fired at a temperature of 1125° C. for three hours to form dense structures. The sintered ceramic capacitors were terminated with a silver conductor paste, that was, again, fired on at 730° C. for about one hour. The finished MLCC's were given run number designations and exhibited the characteristics listed below in Table 4.

TABLE 4

MLCC characteristics for capacitors made in accordance with this disclosure.

| Run # | LT-2509 | LT-2538A | LT-2538B |
| --- | --- | --- | --- |
| Size | .0805 | | |
| Dielectric Type | 07-190 | 07-200 | |
| Electrode | 20 Pt 20 Pd 60 Au | | 70 Ag/30 Pd |
| # Active Layers | 10.5 | | |
| Dielectric Thickness (μm) | ~25 (green) | | |
| Ts | 1125° C./3 hrs. | | |

Figure 5:
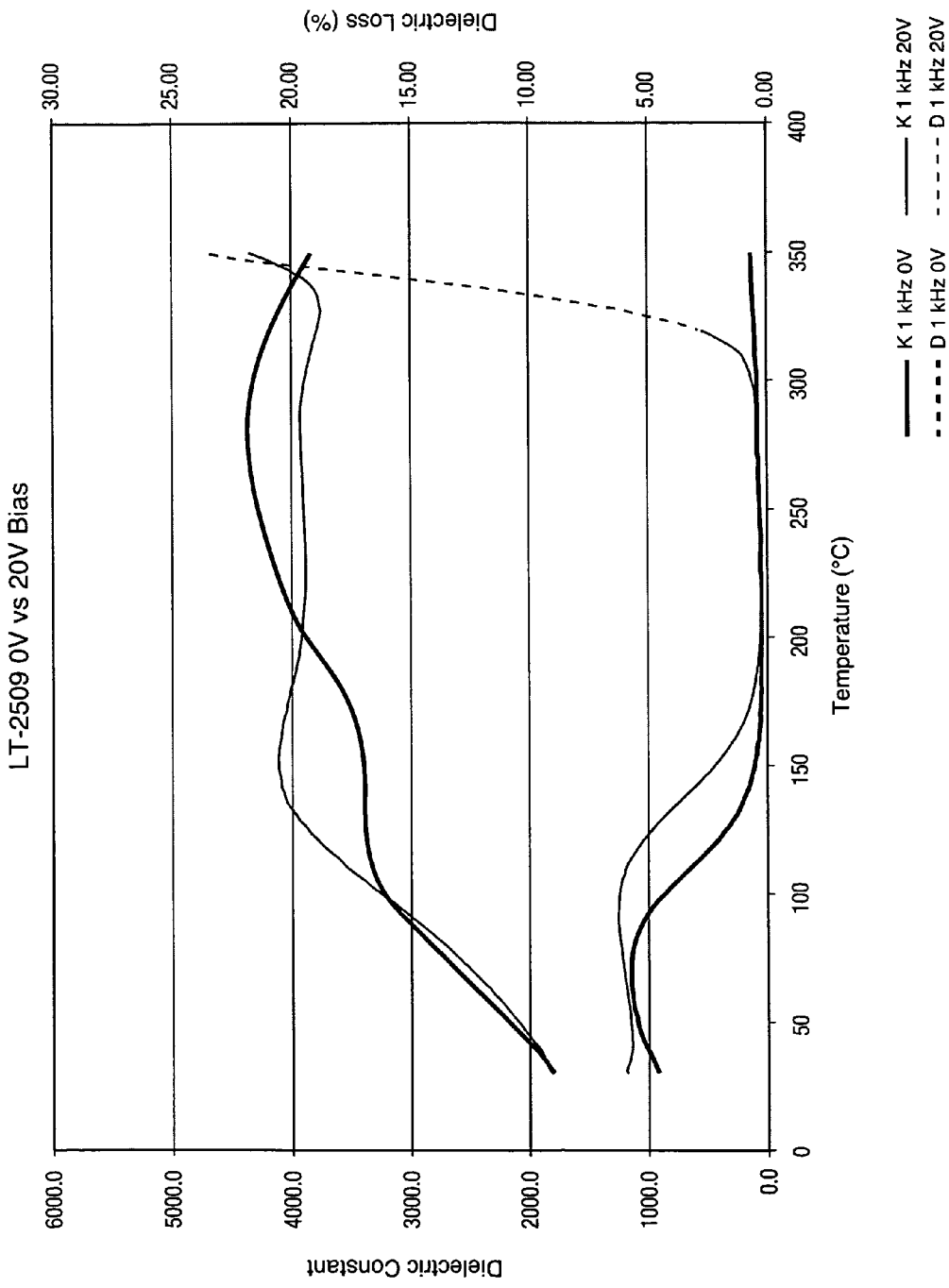
FIG. 5 is a graph showing temperature dependence of dielectric constant and tgδ for Experiment No. LT-2509 with 0 and 20V bias.
Figure 6:
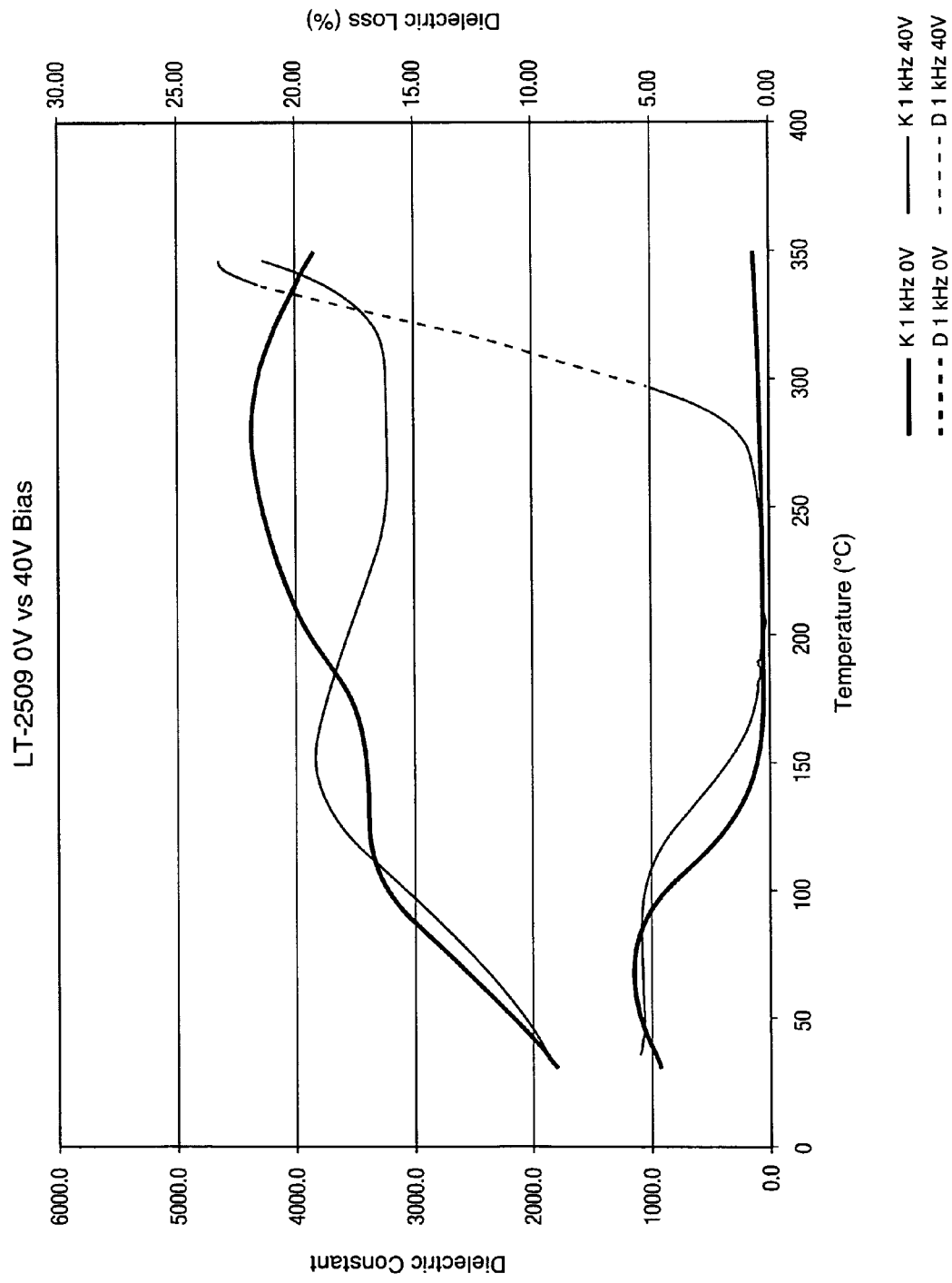
FIG. 6 is a graph showing temperature dependence of dielectric constant and tgδ for Experiment No. LT-2509 with 0 and 40V bias.
Figure 7:
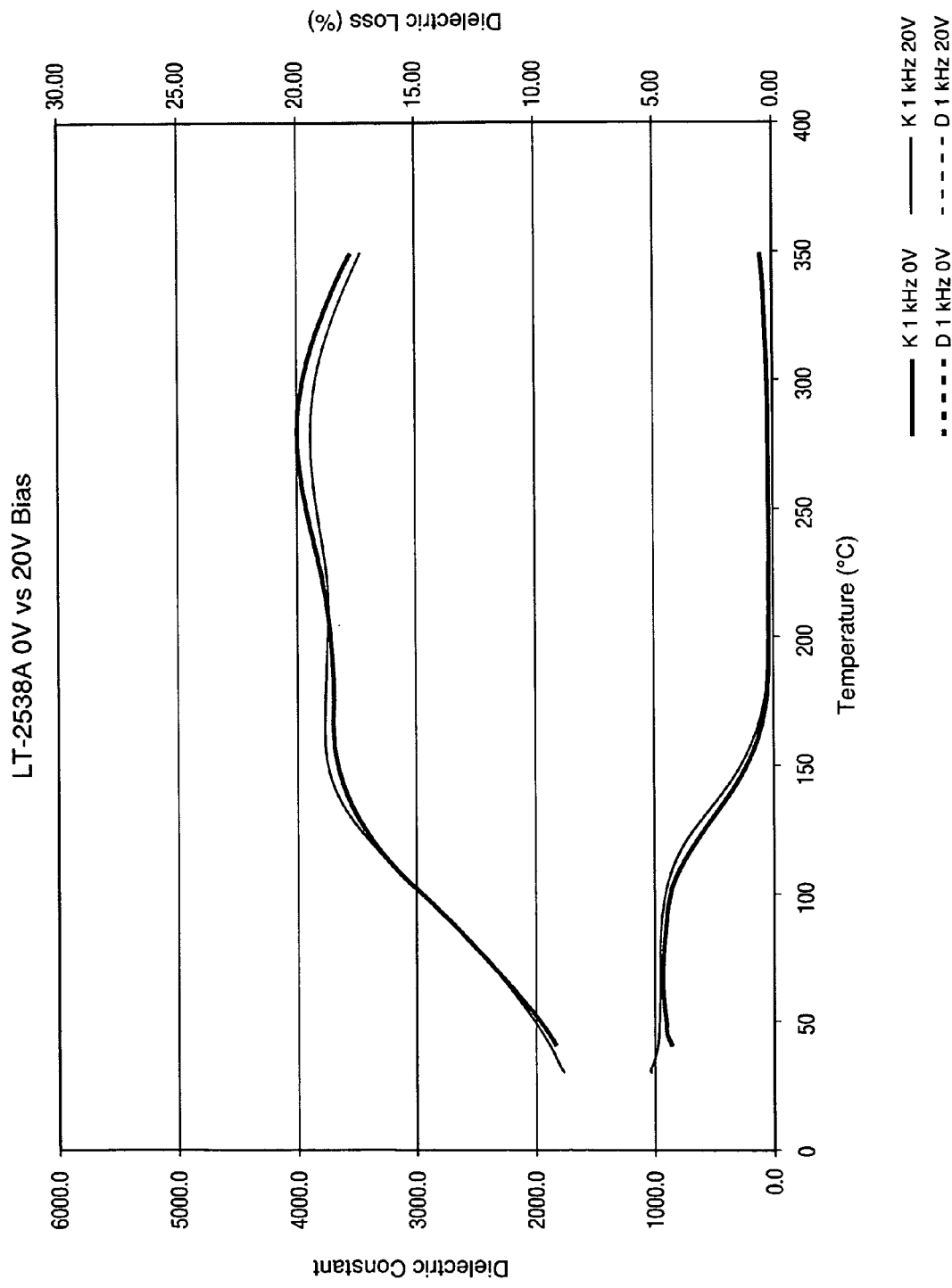
FIG. 7 is a graph showing temperature dependence of dielectric constant and tgδ for Experiment No. LT-2538A with 0 and 20V bias.
Figure 8:
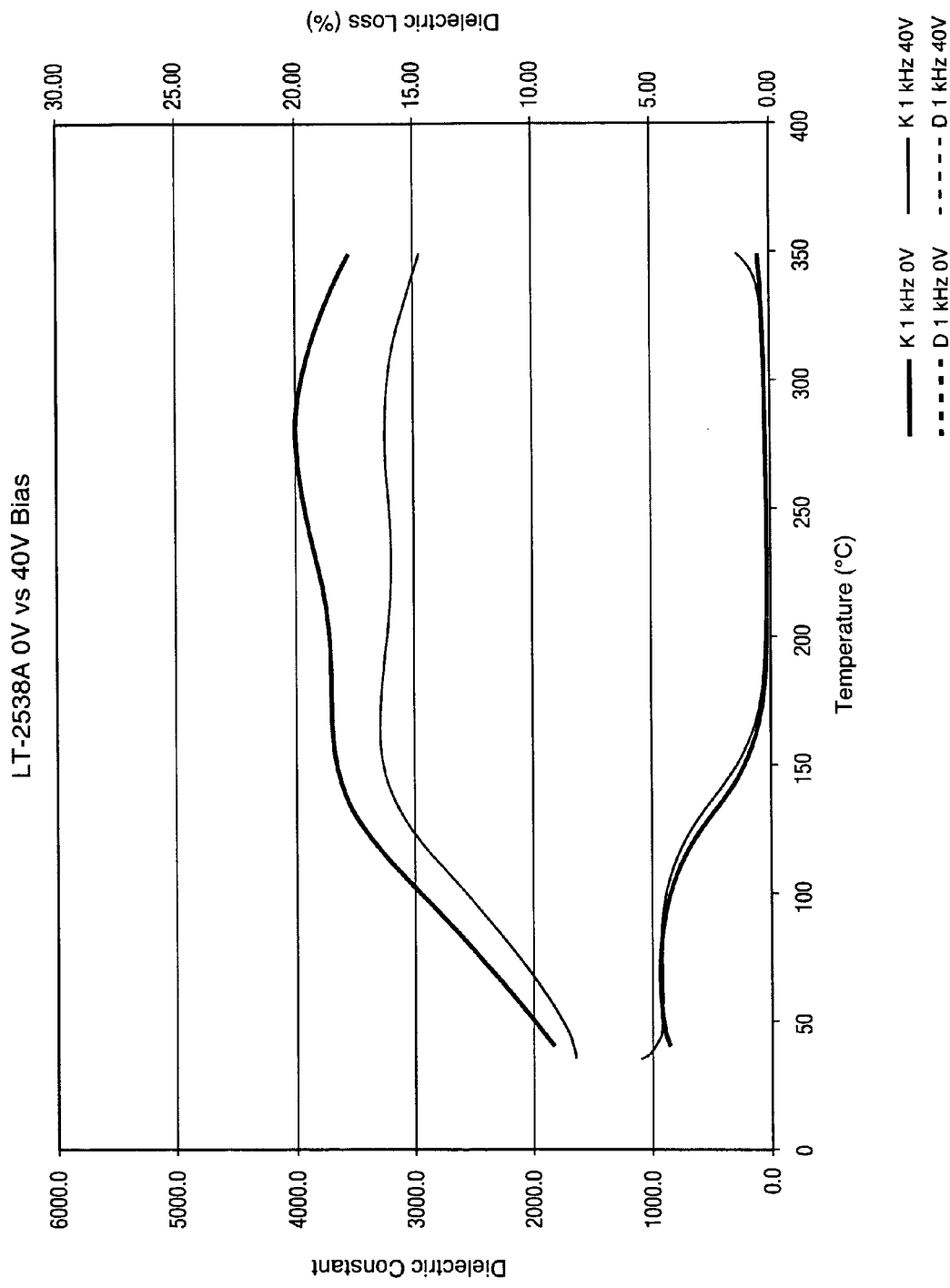
FIG. 8 is a graph showing temperature dependence of dielectric constant and tgδ for Experiment No. LT-2538A with 0 and 40V bias.

MLCC's from each of the three run numbers were then tested to determine change of dielectric constant and dielectric loss over the temperature range from about room temperature to 350° C., with 0, 20, and 40V bias applied. The results for run LT-2509 (07-190 dielectric with 20/20/60 electrodes) are given in FIG. 5 (0 and 20V bias applied) and FIG. 6 (0 and 40V bias applied). FIG. 7 and FIG. 8 give results for LT-2538A (07-200 dielectric with 20/20/60 electrodes) at 0 and 20V bias, and 0 and 40V bias, respectively. Finally, the results for LT-2538B (07-200 dielectric with 70Ag/30 Pd electrodes) are given in FIGS. 9 (0 and 20V bias) and 10 (0 and 40V bias).

Figure 1:
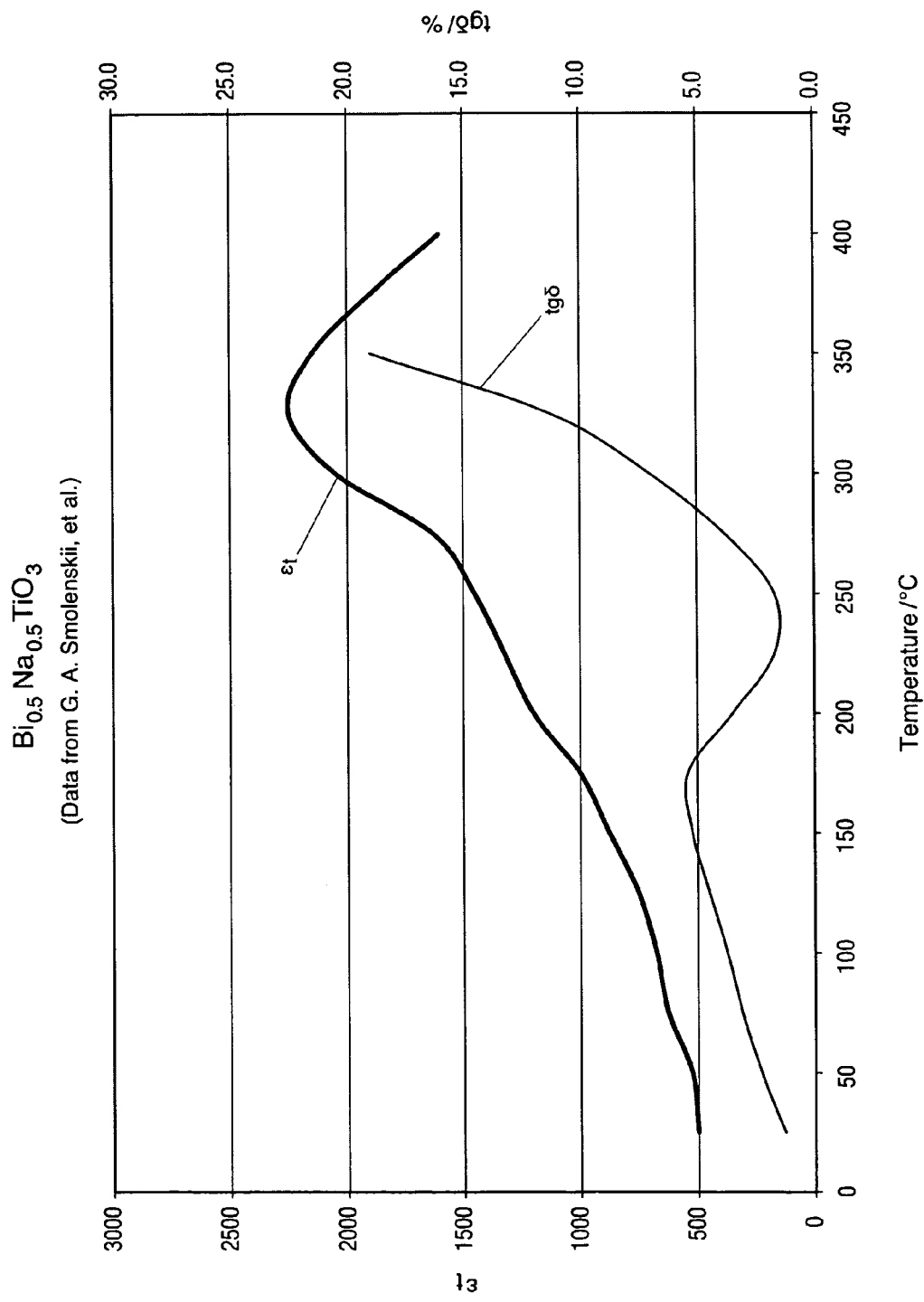
FIG. 1 is a graph showing temperature dependence of dielectric constant and dielectric losses ("tgδ") for $Bi_{0.5}Na_{0.5}TiO_3$.
Figure 2:
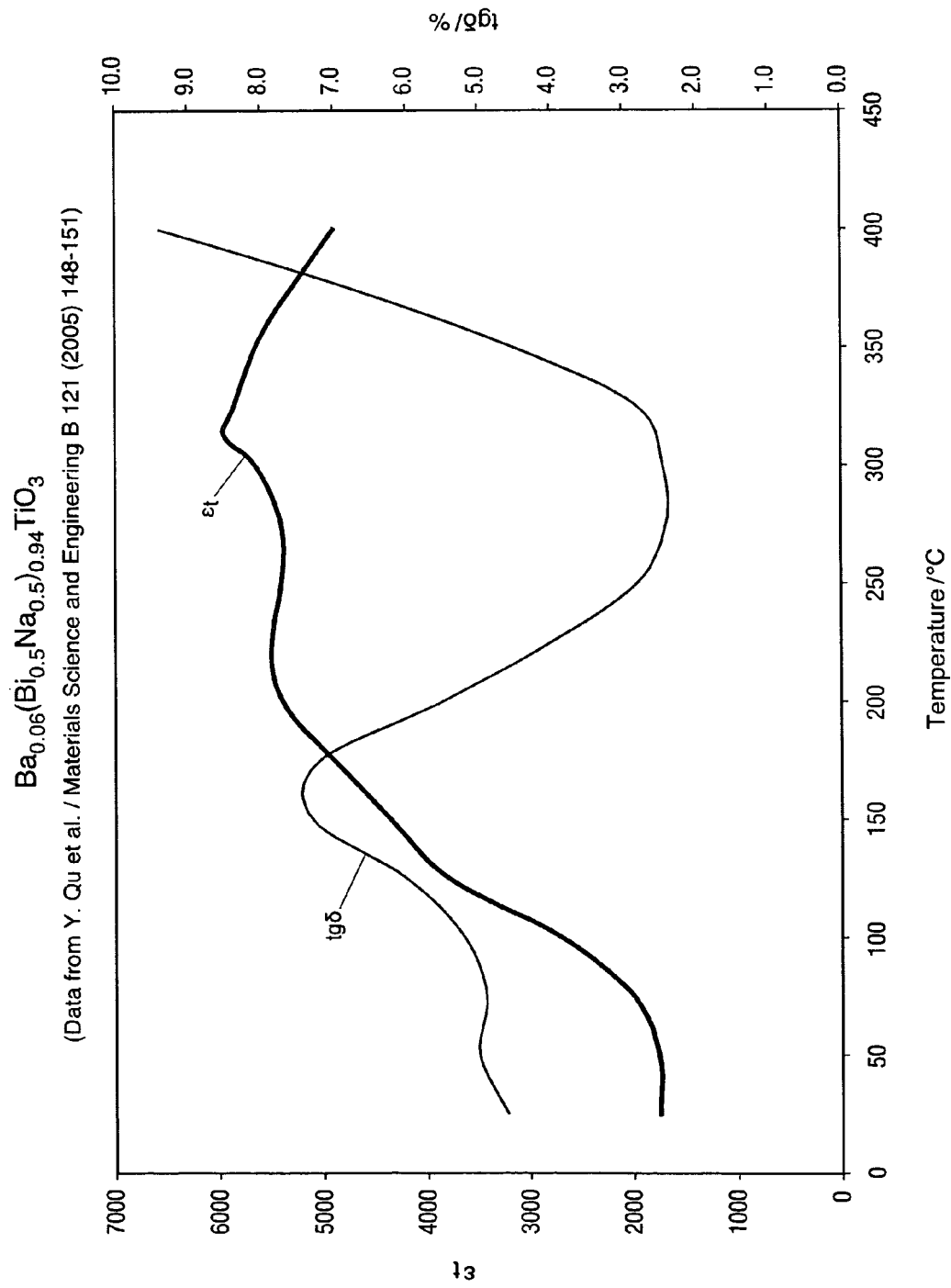
FIG. 2 is a graph showing temperature dependence of dielectric constant and tgδ for $Ba_{0.06}(Bi_{0.5}Na_{0.5})_{0.94}TiO_3$.

When the shape of the dielectric constant versus temperature curves of LT-2509 and LT-2538 are compared to those of $Bi_{0.5}Na_{0.5}TiO_3$ (FIG. 1) and $Ba_{0.06}(Bi_{0.5}Na_{0.5})_{0.94}TiO_3$ (FIG. 2), one can see that there is a progression of first: the compositions developing two transition points (beginning with the $Ba^{2+}$ substitution); and, second: a smoothing of those points that results in a continuous improvement of stability of dielectric constant in the high temperature regime of 150-350° C. (LT-2509 and LT-2538). In addition, both the high and low transition temperatures are shifted to lower temperatures with the novel LT-2509 and LT-2538 dielectrics. Dielectric losses are also dramatically lowered, indicating substantial improvement in the quality of the capacitors for use in high temperature applications.

Comparing the dielectric constant versus temperature, dielectric constant versus temperature with applied DC bias voltage, and dielectric loss curves for compositions LT-2509 (FIGS. 5 and 6) and LT-2538A (FIGS. 7 and 8), we can note significant differences. The more heavily donor/acceptor doped LT-2538A exhibits less change in dielectric constant from 150-350° C. (11.25%) than LT-2509 (22.65%), with 0 volts bias applied. The dielectric constant remains within about 3.2% of the unbiased value when 20V DC is applied to the MLCC's. LT-2509 exhibits a wider fluctuation, as the dielectric constant varies from about 18% higher at 150° C. to approximately 10% lower at about 280° C. The observation of an actual increase in dielectric constant with applied bias from about 100-200° C. for LT-2509 is unusual and surprising. It is likely a polarization effect resulting from the lower donor/acceptor levels present in the dielectric composition. LT-2538 also exhibits improved dielectric loss characteristics, as conductive losses appear to begin to affect LT-2509 at 300° C. Losses for LT-2538A remain low to 350° C.

The same behavior is observed when measurements are made with 40V DC bias applied. The maximum change in dielectric constant is −18.75% for LT-2538A, while LT-2509 ranges from about +12% at 150° C. to −26.4% at about 280° C. High temperature dielectric losses remain low for LT-2538A, while conductive mechanisms begin to affect dielectric properties of the MLCC's made with LT-2509 well below 300° C.

Figure 9:
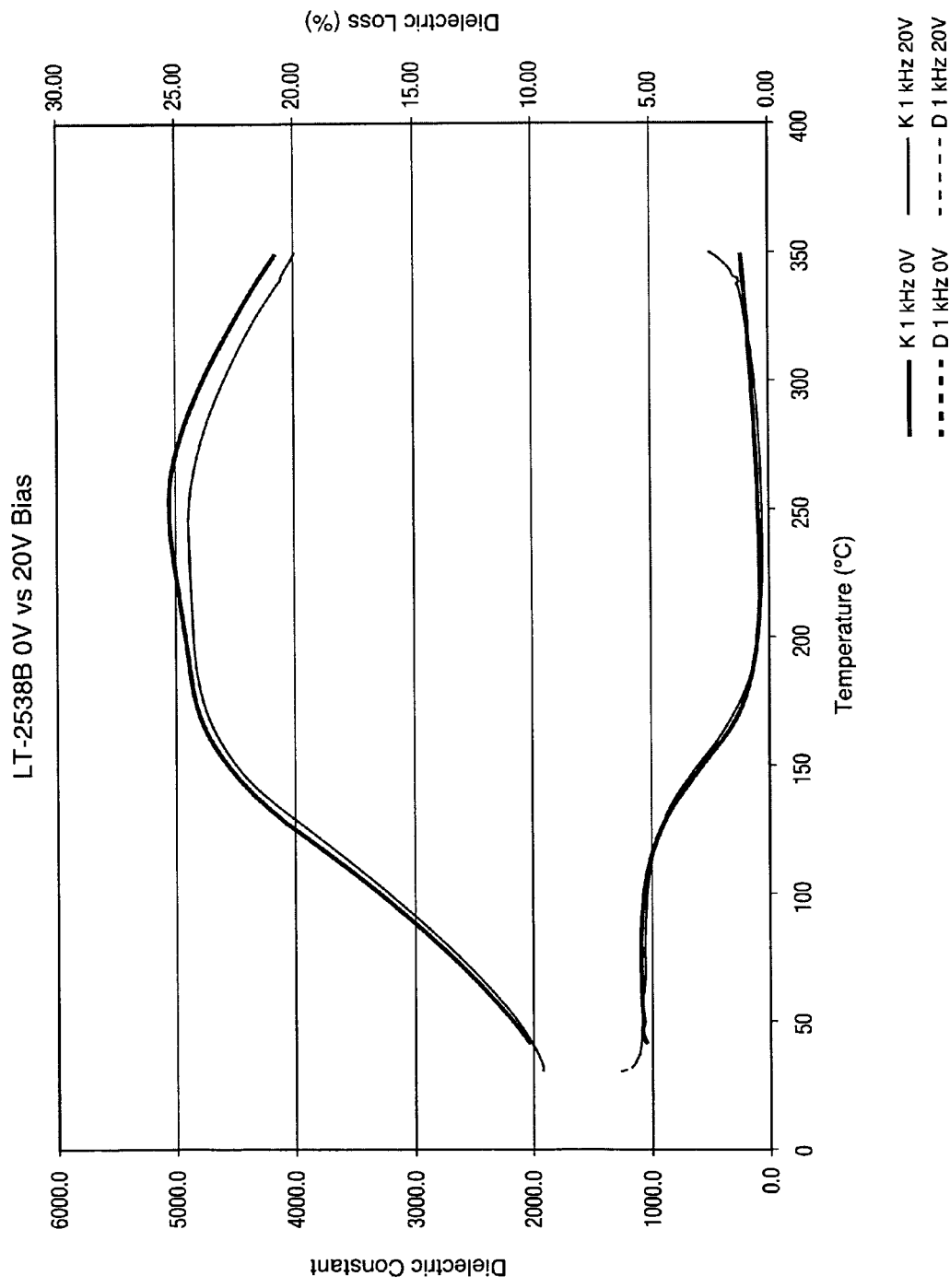
FIG. 9 is a graph showing temperature dependence of dielectric constant and tgδ for Experiment No. LT-2538B with 0 and 20V bias.
Figure 10:
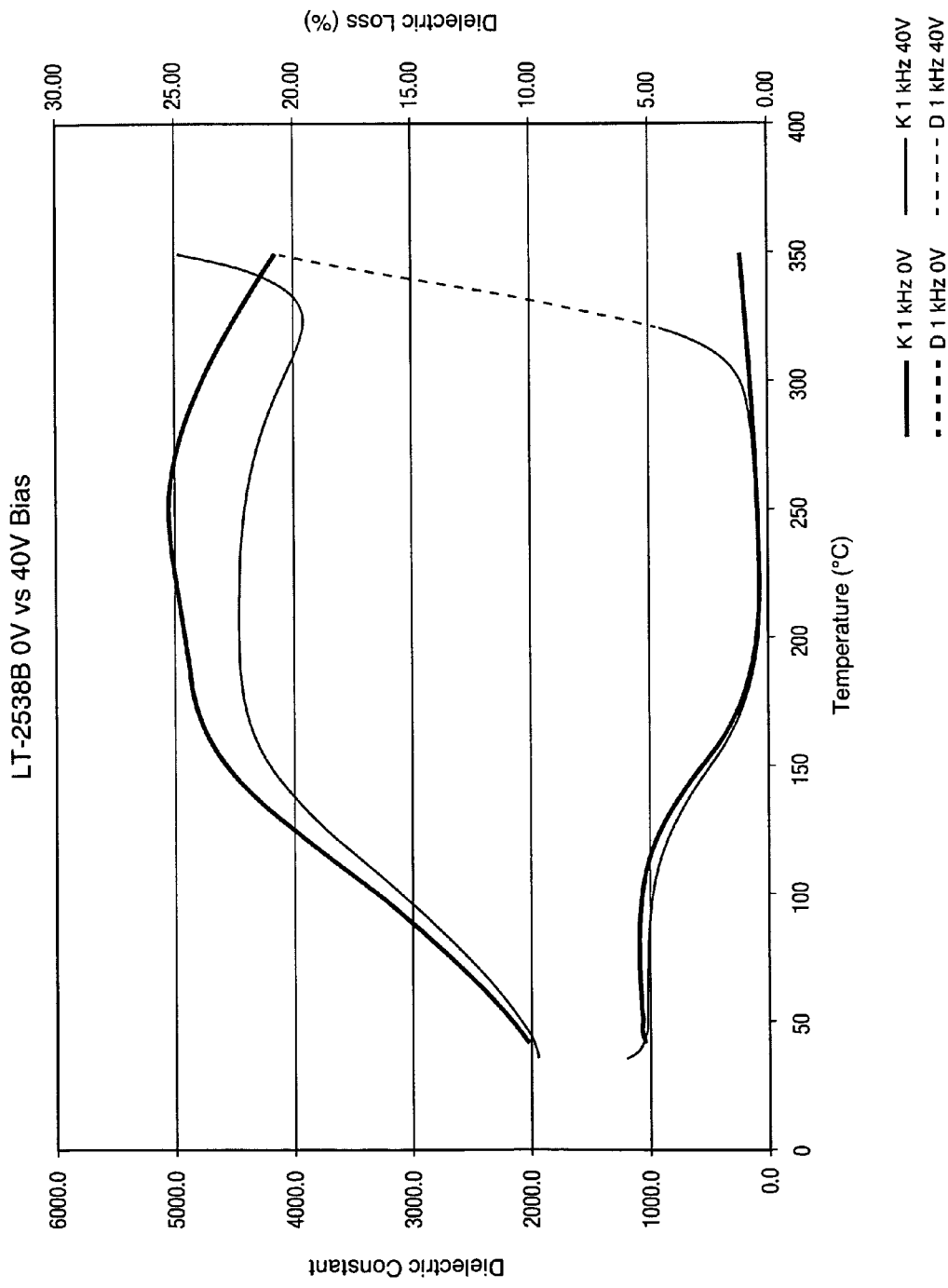
FIG. 10 is a graph showing temperature dependence of dielectric constant and tgδ for Experiment No. LT-2538B with 0 and 40V bias.

The effect of electrode composition can be determined by evaluating results obtained for LT-2538A (FIGS. 7 and 8) (20/20/60 electrode) and LT-2538B (70Ag/30Pd) (FIGS. 9 and 10). LT-2538B exhibits a maximum change in dielectric constant versus temperature with 0V bias of −18.15% over the range of 150-350° C. Maximum change with 20V DC bias is about −4.6%, and with 40V DC bias applied it ranges from −13.1% at approximately 250° C. to 16.9% at 350° C., when conductive losses dominate performance. In addition, the effective dielectric constant measured for LT-2538B reaches about 5075 and the high temperature Curie point appears to shift to about 250° C. In comparison, the maximum dielectric constant obtained for LT-2538A is about 4000 at approximately 280° C. While these results indicate that LT-2538A exhibits less variation in dielectric constant versus temperature and the onset of high temperature conductive losses is depressed out to 350° C. with 40V DC bias applied, the LT-2538B data does suggest that the less costly and more readily available 70Ag/30Pd electrode system can be employed with the more heavily donor/acceptor doped and fluxed composition to produce high temperature multilayer capacitors with good stability of dielectric constant versus temperature, with excellent DC voltage characteristics, and low dielectric losses to about 300° C. Data derived from the temperature coefficient of dielectric constant and dielectric loss curves depicted in FIGS. 4-10 is summarized in Table 5.

minus 15% over the operating temperature range of 150° C. to about 300° C., and with excellent dielectric constant/voltage characteristics, so that dielectric constant does not change by more than about 20% over that same operating temperature range.

A preferred embodiment of the current invention is a high temperature ceramic dielectric composition consisting essentially of about 98.35 mole % of the solid-solution $Ba_{0.06}(Bi_{0.5}Na_{0.6})_{0.94}TiO_3$, about 0.88 mole % $Nb_2O_5$, about 0.09 mole % MnO, about 0.13 mole % $Nd_2O_3$, about 0.29 mole % ZnO, and about 0.26% mole % $SiO_2$. (For purposes herein, the word "about" is to mean plus or minus twenty percent.) When a multilayer ceramic capacitor is manufactured with this dielectric it exhibits a dielectric constant of between about 3600 and 4000, or greater, from about 150° C. to over 300° C., with a tgδ of less than 1.0% at a measurement frequency of 1 KHz and 1 Volt RMS. In addition, the dielectric constant remains within 80% of that obtained with 0V bias when a bias of 50V/mil (greater than 1.9V/micron) is applied over that temperature range. This is in sharp contrast to current ceramic dielectrics based on $BaTiO_3$, which become unsuitable for use at temperatures exceeding about 200° C., due to excessive loss of dielectric constant (greater than 60%), loss of resistivity, and decline in over-all reliability.

The results clearly show that the novel compositions of the present disclosure hold a distinct advantage over traditional $BaTiO_3$ based BX grade formulations by enabling high temperature capacitor manufacturers to increase dielectric constant by 10 times in the critical operating temperature range, or alternatively, to reduce the potential physical size of the capacitor by about the same proportion.

The novel high temperature ceramic dielectric compositions of the present disclosure can also be classed as "environmentally friendly". The information provided in Table 2 confirms that they contain no additions of compounds of environmentally hazardous lead, cadmium, or hexavalent chromium.

TABLE 5

Curie point, dielectric constant at 0, 20, 40 V bias, at various temperatures, and change in dielectric constant with bias for MLCC's tested in accordance with this disclosure.

| Run #<br>Curie pt. ($T_c$) | LT-2509<br>~280° C. | ΔK w/<br>bias (%) | LT-2532A<br>~280° C. | ΔK w/<br>bias (%) | LT-2532B<br>~250° C. | ΔK w/<br>bias % |
|---|---|---|---|---|---|---|
| Dielectric Constant @ RT | 1800 | — | 1750 | — | 2000 | — |
| Dielectric Constant @ 150° C. | 3380 | — | 3630 | — | 4600 | — |
| Dielectric Constant @ 150° C., 20 Vdc | 4120 | +18.0 | 3750 | +3.2 | 4462 | −3.0 |
| Dielectric Constant @ 150° C., 40 Vdc | 3843 | +12.0 | 3280 | −9.64 | 4167 | −9.41 |
| Dielectric Constant @ $T_c$ | 4370 | — | 4000 | — | 5075 | — |
| Dielectric Constant @ $T_c$, 20 Vdc | 3935 | −9.95 | 3875 | −3.1 | 4840 | −4.63 |
| Dielectric Constant @ $T_c$, 40 Vdc | 3215 | −26.4 | 3250 | −18.75 | 4410 | −13.1 |
| Dielectric Constant @ 350° C. | 3857 | — | 3550 | — | 4154 | — |
| Dielectric Constant @ 350° C., 20 Vdc | 4300 | +10.3 | 3450 | −2.82 | 4000 | −3.7 |
| Dielectric Constant @ 350° C., 40 Vdc | 4500 | +14.3 | 2940 | −17.18 | 5000 | +16.9 |

Figure 3:
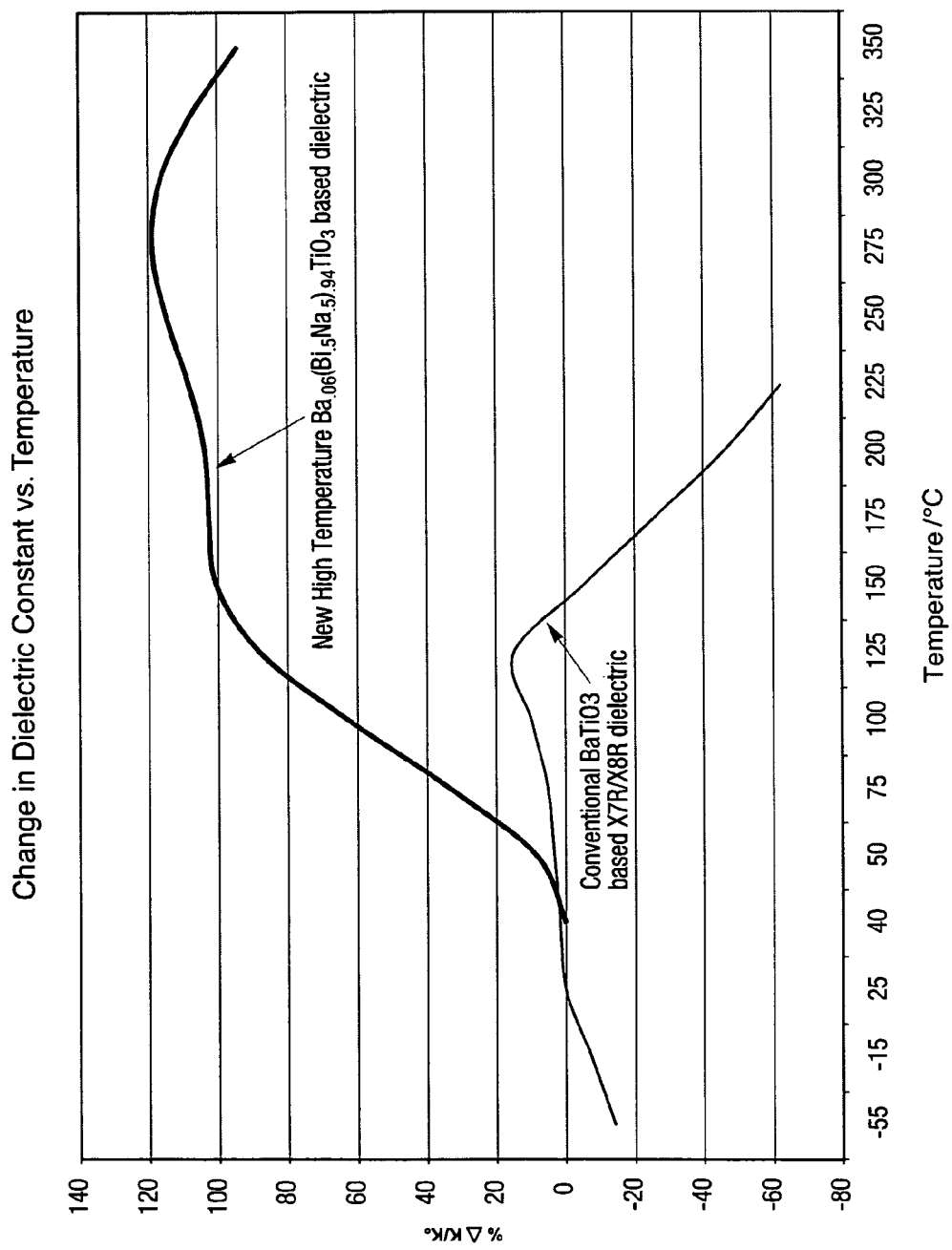
FIG. 3 is a graph showing temperature dependence of dielectric constant for a conventional $BaTiO_3$ based X8R dielectric compared to a new high temperature ceramic dielectric composition manufactured in accordance with the present invention.

Again, comparing the temperature coefficient of dielectric constant curves of the novel compositions disclosed herein (FIGS. 5-10) compared to that for conventional $BaTiO_3$ based X8R (FIG. 3), $Bi_{0.5}Na_{0.5}TiO_3$ (FIG. 1) and $Ba_{0.06}(Bi_{0.5}Na_{0.5})TiO_3$ (FIG. 2), the new high temperature dielectric compositions can be employed to produce MLCC's with the desired properties of high dielectric constant of between 3600 and 4000, or greater, with low dielectric losses (tgδ) of less than 1%, a low change of dielectric constant of less than plus or It has been shown by the data in Table 3 that acceptable high temperature dielectric compositions can be prepared by incorporating a base dielectric of the formula $Me_x(Bi_{0.5}Na_{0.5})_{1-x}TiO_3$ where Me=$Ba^{2+}$ or $Sr^{2+}$ and X=from about 0.06 to 0.12, that is modified with additions of donor ions such as $Nb^{5+}$ and $Nd^{3+}$, acceptor ions such as $Zn^{2+}$ and $Mn^{2+}$, and a glass former such as $SiO_2$, or other glass forming compounds. More specifically, improved high temperature multilayer ceramic capacitors have been produced incorporating a base dielectric of the formula $Me_x(Bi_{0.5}Na_{0.5})_{1-x}TiO_3$, that is modified by the addition of certain donor ions such as $Nb^{5+}$ and $Nd^{3+}$, acceptor ions such as $Zn^{2+}$ and $Mn^{2+}$, by way of oxides thereof, and a glass forming agent such as $SiO_2$ or other glass forming compounds.

Figure 11:
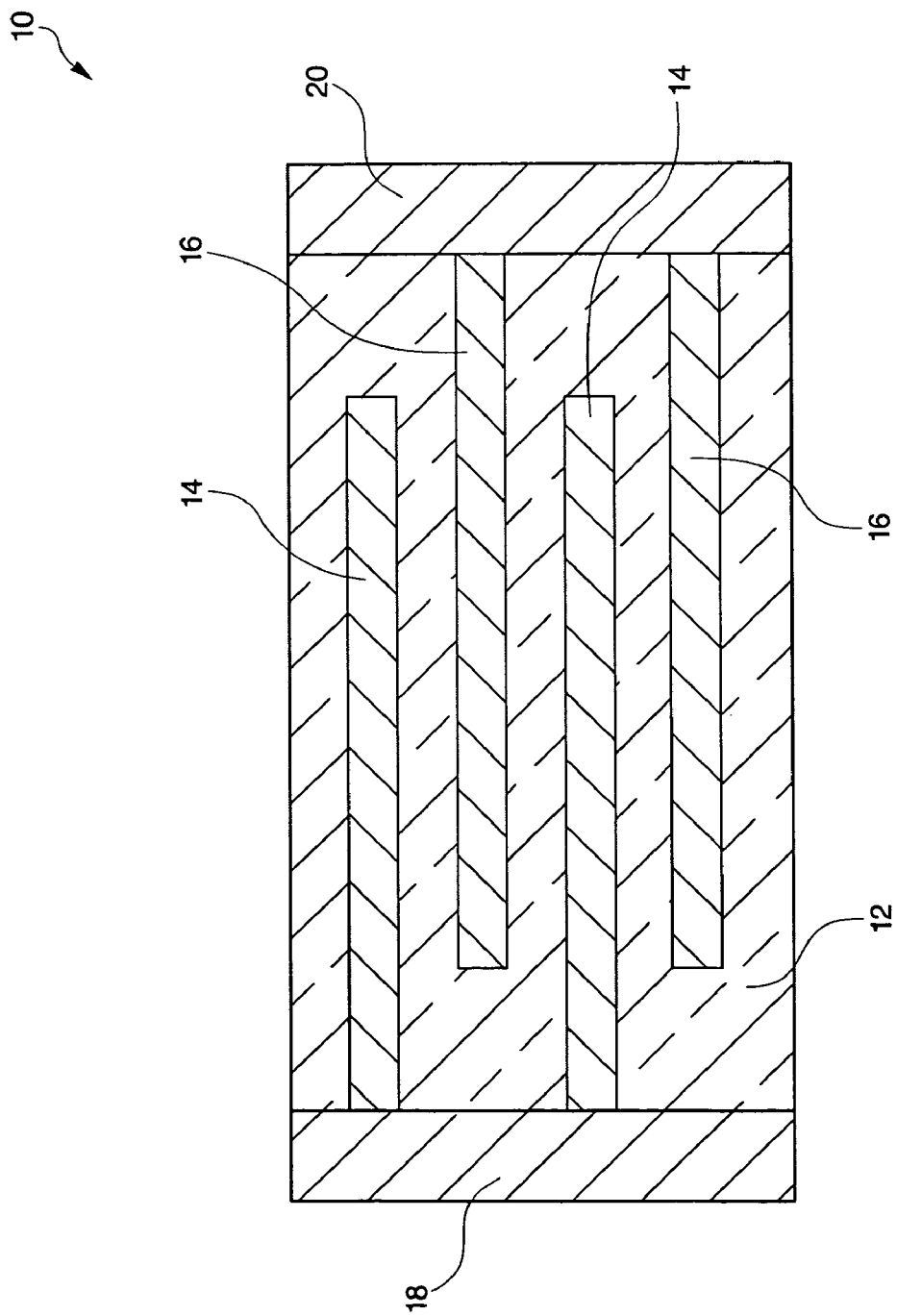
FIG. 11 is a cross-sectional, simplified view of a multilayer ceramic capacitor constructed in accordance with the present invention.

A simplified, schematic multilayer ceramic capacitor is shown in FIG. 11, and is generally designated by the reference numeral 10. The capacitor 10 includes a ceramic body 12, a first group or plurality of electrodes 14 buried within the body 12, a second group or plurality of electrodes 16 buried in the body 12 in capacitive relationship with the first plurality of electrodes 14, a first external terminal 18 connected to the first group of electrodes 14, and a second external electrode 20 connected to the second group of electrodes 16. The body 12 of the MLCC includes the above described base dielectric of the formula $Me_x(Bi_{0.5}Na_{0.5})_{1-x}TiO_3$, that is modified by the addition of certain donor ions such as $Nb^{5+}$ and $Nd^{3+}$, acceptor ions such as $Zn^{2+}$ and $Mn^{2+}$, and a glass forming agent such as $SiO_2$, or other glass forming compounds.

While this invention has been described in detail in connection with only certain embodiments thereof, it will be apparent to one skilled in the art that it is capable of still further modification such as the addition of other known donor ions such as $La^{3+}$, $Pr^+$, $Sm^{3+}$, $Gd^{3+}$, $Ce^{4+}$, $Ta^{5+}$, or $W^{6+}$ or the like, or other known acceptors such as $Ni^{2+}$ or $Co^{2+}$, $Co^{3+}$, or the like, or other glass formers such as $B^{3+}$, $Ge^{4+}$, or $V^{5+}$ or the like. Accordingly, reference should be made primarily to the attached claims rather than to the foregoing description and examples to determine the scope of the invention.

What is claimed is:

1. A high temperature ceramic dielectric composition suitable for use within a capacitor, the composition comprising:
   a. about 98.35 mole % of a calcined base mixture of $Me_x(Bi_{0.5}Na_{0.5})_{1-x}TiO_3$, wherein Me is selected from the group consisting of $Ba^{2+}$ and $Sr^{2+}$, and wherein X is from between about 0.06 and about 0.12;
   b. about 0.88 mole % of at least one oxide of small donor cations, the at least one oxide of small donor cations including an oxide of at least one of $Nb^{5+}$, $Ta^{5+}$, and $W^{6+}$ small donor cations;
   c. about 0.38 mole % of at least one oxide of acceptor cations;
   d. about 0.13 mole % of oxides of large donor cations selected from the group consisting of $Nd_2O_3$, other rare earth oxides, and combinations thereof; and,
   e. about 0.26% mole % of a glass forming compound selected from the group consisting of $SiO_2$, $B_2O_3$, $GeO_2$, $V_2O_5$, and combinations thereof.

2. The high temperature ceramic dielectric composition of claim 1, wherein the oxides of small and large donor cations are selected from the group of oxides of small and large donor cations consisting of $Nb^{5+}$, $Nd^{3+}$, $Ta^{5+}$, and $W^{6+}$.

3. The high temperature ceramic dielectric composition of claim 1, wherein the oxides of small and large donor cations are selected from the group of oxides of small and large donor cations consisting of $Nb^{5+}$, $Nd^{3+}$, $Ta^{5+}$, $W^{6+}$, $La^{3+}$, $Pr^{3+}$, $Sm^{3+}$, $Gd^{3+}$ and $Ce^{4+}$.

4. The high temperature ceramic dielectric composition of claim 1, wherein the about 0.38 mole % of at least one oxide of acceptor cations includes about 0.09 mole % of MnO.

5. The high temperature ceramic dielectric composition of claim 1, wherein the about 0.38 mole % of at least one oxide of acceptor cations includes about 0.09 mole % of MnO and about 0.29 mole % of oxides of additional acceptor cations selected from the group of oxides of cations consisting of $Zn^{2+}$, $Ni^{2+}$, $Co^{2+}$ and $Co^{3+}$.

6. The high temperature ceramic dielectric composition of claim 1, wherein the glass forming compound is $SiO_2$.

7. A multilayer ceramic capacitor having at least one electrode buried within a body of the capacitor and an external electrode secured in electrical communication with the electrode, the body comprising:
   a. about 98.35 mole % of a calcined base mixture of $Me_x(Bi_{0.5}Na_{0.5})_{1-x}TiO_3$, wherein Me is selected from the group consisting of $Ba^{2+}$ and $Sr^{2+}$, and wherein X is from between about 0.06 and about 0.12;
   b. about 0.88 mole % of at least one oxide of small donor cations, the at least one oxide of small donor cations including an oxide of at least one of $Nb^{5+}$, $Ta^{5+}$, and $W^{6+}$ small donor cations;
   c. about 0.38 mole % of at least one oxide of acceptor cations;
   d. about 0.13 mole % of oxides of large donor cations selected from the group consisting of $Nd_2O_3$, other rare earth oxides, and combinations thereof; and,
   e. about 0.26% mole % of a glass forming compound selected from the group consisting of $SiO_2$, $GeO_2$, $V_2O_5$, and combinations thereof.

8. The multilayer ceramic capacitor of claim 7, wherein the oxides of small and large donor cations are selected from the group of oxides of small and large donor cations consisting of $Nb^{5+}$, $Ta^{5+}$, and $W^{6+}$.

9. The multilayer ceramic capacitor of claim 7, wherein the oxides of small and large donor cations are selected from the group of oxides of small and large donor cations consisting of $Nb^{5+}$, $Ta^{5+}$, $W^{6+}$, $La^{3+}$, $Pr^{3+}$, $Sm^{3+}$, $Gd^{3+}$ and $Ce^{4+}$.

10. The multilayer ceramic capacitor of claim 7, wherein the about 0.38 mole % of at least one oxide of acceptor cations includes about 0.09 mole % of MnO.

11. The multilayer ceramic capacitor of claim 7, wherein the about 0.38 mole % of at least one oxide of acceptor cations includes about 0.09 mole % of MnO and about 0.29 mole % of oxides of additional acceptor cations selected from the group of oxides of cations consisting of $Zn^{2+}$, $Ni^{2+}$, $Co^{2+}$ and $Co^{3+}$.

12. The multilayer ceramic capacitor of claim 11 further comprising the capacitor having a dielectric constant of between about 3600 and about equal to or greater than 4000, with dielectric losses of less than 1% over a temperature range from about 150° C. to about 300° C., at a measurement frequency of 1 KHz and 1 VRMS.

13. The multilayer ceramic capacitor of claim 11 further comprising the capacitor having changes of dielectric constant of less than about plus or minus 15% over an operating temperature range of about 150° C. to about 300° C.

14. The multilayer ceramic capacitor of claim 11 further comprising the capacitor having dielectric constant/voltage characteristics wherein the dielectric constant changes are less than about 20% over an operating temperature range of about 150° C. to about 300° C. whenever a bias of up to 40 volts direct current is applied at dielectric thicknesses of about 0.001 inch (0.02540 mm).

15. The multilayer ceramic capacitor of claim 7, wherein the body of the capacitor consists essentially of:
   a. about 98.35 mole % of a calcined base mixture of $Me_x(Bi_{0.5}Na_{0.5}TiO_3$, wherein Me is selected from the group consisting of $Ba^{2+}$ and $Sr^{2+}$, and wherein X is from between about 0.06 and about 0.12;
   b. about 0.88 mole % of at least one oxide of small donor cations;
   c. about 0.38 mole % of at least one oxide of acceptor cations;
   d. about 0.13 mole % of oxides of large donor cations selected from the group consisting of $Nd_2O_3$, other rare earth oxides, and combinations thereof; and,
   e. about 0.26% mole % of a glass forming compound selected from the group consisting of $SiO_2$, $B_2O_3$, $GeO_2$, $V_2O_5$, and combinations thereof.

16. A high temperature ceramic dielectric composition suitable for use within a capacitor, the composition comprising:
  a. about 98.35 mole % of a calcined base mixture of $Me_x(Bi_{0.5}Na_{0.5})_{1-x}TiO_3$, wherein Me is selected from the group consisting of $Ba^{2+}$ and $Sr^{2+}$, and wherein X is from between about 0.06 and about 0.12;
  b. about 0.88 mole % of oxides of small donor cations selected from the group of oxides of cations consisting of $Nb^{5+}$, $Ta^{5+}$, and $W^{6+}$;
  c. about 0.09 mole % of MnO yielding acceptor cations;
  d. about 0.13 mole % of oxides of large donor cations selected from the group consisting of $Nd_2O_3$ and other rare earth oxides;
  e. about 0.29 mole % of oxides of additional acceptor cations selected from the group of oxides of cations consisting of $Zn^{2+}$, $Ni^{2+}$, $Co^{2+}$ and $Co^{3+}$; and,
  f. about 0.26% mole % of a glass forming compound selected from the group consisting of $SiO_2$, $B_2O_3$, $GeO_2$, $V_2O_5$, and combinations thereof.

17. The high temperature ceramic dielectric composition of claim 16, wherein the glass forming compound is $SiO_2$.

* * * * *